(12) United States Patent
Schultink et al.

(10) Patent No.: US 7,744,680 B2
(45) Date of Patent: Jun. 29, 2010

(54) VACUUM-CLEANER BAG AND METHOD FOR EXTENDING THE SERVICE LIFE OF VACUUM-CLEANER BAGS

(75) Inventors: Jan Schultink, Overpelt (BE); Ralf Sauer, Overpelt (BE)

(73) Assignee: Eurofilters N.V., Overpelt (BE)

( * ) Notice: Subject to any disclaimer, the term of this patent is extended or adjusted under 35 U.S.C. 154(b) by 916 days.

(21) Appl. No.: 10/582,651

(22) PCT Filed: Dec. 17, 2004

(86) PCT No.: PCT/EP2004/014473

§ 371 (c)(1),
(2), (4) Date: Jun. 13, 2006

(87) PCT Pub. No.: WO2005/060807

PCT Pub. Date: Jul. 7, 2005

(65) Prior Publication Data

US 2007/0130894 A1 Jun. 14, 2007

(30) Foreign Application Priority Data

Dec. 19, 2003 (DE) .................. 103 59 948

(51) Int. Cl.
*A47L 7/00* (2006.01)
*A47L 7/04* (2006.01)

(52) U.S. Cl. .............. 95/273; 55/368; 55/372; 55/382; 55/515; 55/DIG. 2; 15/347; 95/287

(58) Field of Classification Search .......... 95/57, 95/78, 287, 273; 96/15, 69; 15/347, 352, 15/246.3, 339; 55/382, 486, 487, DIG. 2, 55/DIG. 39, 372, 368, 515
See application file for complete search history.

(56) References Cited

U.S. PATENT DOCUMENTS

| 1,863,883 | A | * | 6/1932 | Schneider | .............. 422/124 |
|---|---|---|---|---|---|
| 2,804,166 | A | | 8/1957 | Stevens et al. | |
| 3,939,694 | A | * | 2/1976 | Guichard et al. | ........... 73/23.33 |
| 5,461,751 | A | * | 10/1995 | Sepke | .............. 15/246.3 |
| 6,171,369 | B1 | * | 1/2001 | Schultink et al. | ........... 95/57 |
| 6,183,536 | B1 | * | 2/2001 | Schultink et al. | ........... 95/57 |
| 6,514,325 | B2 | * | 2/2003 | Cox et al. | ........... 96/69 |
| 6,669,761 | B2 | * | 12/2003 | Schultheiss et al. | ........... 96/66 |
| 7,097,694 | B1 | * | 8/2006 | Jaroszczyk et al. | ........... 96/17 |
| 7,101,423 | B2 | * | 9/2006 | Lersch et al. | ........... 96/68 |
| 2008/0115671 | A1 | * | 5/2008 | Sauer et al. | ........... 96/223 |

FOREIGN PATENT DOCUMENTS

| AU | B-73975/94 | 2/1995 |
|---|---|---|
| CN | 1365262 | 8/2002 |
| DE | 1 151 905 | 7/1963 |
| DE | 27 33 861 | 2/1979 |
| DE | 38 00 252 | 2/1989 |
| DE | 100 30 958 | 2/2001 |
| EP | 0 161 790 | 11/1985 |
| EP | 0 338 479 | 10/1989 |
| EP | 1 198 280 | 6/2003 |
| EP | 0 960 645 | 8/2003 |
| EP | 1199969 | 9/2004 |
| WO | 01/08543 | 2/2001 |
| WO | WO 01/08543 | 2/2001 |

* cited by examiner

*Primary Examiner*—Duane Smith
*Assistant Examiner*—Minh-Chau T Pham
(74) *Attorney, Agent, or Firm*—Fay Kaplun & Marcin, LLP

(57) ABSTRACT

Described is a vacuum-cleaner bag which is made of an air-permeable filter material and forms a closed dust-collecting chamber, the vacuum-cleaner bag containing a material which can be whirled up under a given air flow.

27 Claims, 11 Drawing Sheets

VACUUM-CLEANER BAG AND METHOD FOR EXTENDING THE SERVICE LIFE OF VACUUM-CLEANER BAGS

FIELD OF INVENTION

The present invention relates to a vacuum-cleaner bag which is made of an air-permeable filter material and forms a closed dust-collecting chamber, the vacuum-cleaner bag being distinguished by the fact that a material which can be whirled up under a given air flow is contained in the dust-collecting chamber. The invention also relates to a method for extending the service life of vacuum-cleaner bags in which a vacuum-cleaner bag as described above is used.

BACKGROUND INFORMATION

Numerous different filter materials and material combinations are used for vacuum-cleaner bags. In addition to the conventional paper or paper-tissue bags, bags which are made of combinations of paper with synthetic non-woven or even vacuum-cleaner bags which consist completely of non-wovens are known. Thus for example the document EP-A-0 338 479 describes a paper/meltblown combination and the document EP 0 161 790 describes a triple-ply spunbond/meltbond/spunbond composite (SMS). Such filter materials which have a fine-filter layer formed from meltblown material considerably improve the deposition efficiency compared with a single-ply paper bag or a double-ply paper-tissue bag. In recent years, multilayer composite materials of differing composition have in addition increasingly become known by means of which especially the dust storage capacity has been able to be improved. In EP-A-0 960 645 is described a material of this type formed from different non-woven layers and a fine-filter layer.

The use of these novel composite materials for manufacturing vacuum-cleaner bags has led to the possibility of extending the service life of said bags.

However, the extension of the service life which can be achieved using these novel filter bags is still in need of improvement in the sense of optimal exploitation of the filter bag especially when the filter is highly loaded with fine dust. Furthermore it is desirable also to considerably extend the service life of filters which are made of simple combined filter media.

Furthermore, from DE-0S 27 33 861 A is known a filter arrangement for a vacuum-cleaner. In the filter arrangement described there, a surface-active material is contained in a receptacle which consists of a dimensionally stable material and is delimited by two sieve-plates. This filter arrangement is therefore also used in accordance with the teaching of the disclosure document as a pre-filter for a vacuum-cleaner, i.e. the arrangement formed from a dimensionally stable material is positioned upstream of the actual vacuum-cleaner bag.

A substantial disadvantage of this arrangement, however, is that this device is only suitable for filtering out any fine dust which might occur. In the event of other dust fractions being present as well as the fine dust, this filter arrangement cannot be used since in these cases the sieve-plates delimiting the receptacle would become clogged.

This is also particularly true of typical house dust which is distinguished by a considerable portion of fibres. The filter cake forming on the sieve-plate facing the incoming flow would make any further operating impossible after only a very short time.

What is also disadvantageous is that in this arrangement only very large spheres with a corresponding small surface and correspondingly small binding capacity for fine dust can be used. Smaller spheres would have to be held back using even finer sieves in the upstream filter, which leads to even greater problems with coarse/fibre-containing dust.

SUMMARY OF INVENTION

The present invention relates to a vacuum-cleaner bag which, in comparison with the known vacuum-cleaner bags, both those made of paper and those made of paper/meltblown combinations or spunbond/meltbond/spunbond composites (SMS) and non-woven bags having a capacity layer, can accommodate a substantially larger amount of dust without the pressure loss increasing too severely. The present invention also relates to a method which leads to an extension of the service life of vacuum-cleaner bags.

Thus according to the invention a vacuum-cleaner bag is proposed which contains a material which can be whirled up under the given air flow. Completely surprisingly it has become apparent that when a material which can be whirled up under the given air flow is contained in the vacuum-cleaner bag, which in itself must form a closed dust-collecting chamber, the amount of dust which can be accommodated is increased by up to a factor of 5 by comparison with conventional filter bags. Thus for example in a vacuum-cleaner bag for vacuum-cleaners having a filter volume of approx. 3 liters, more than 350 g dust can be accommodated, whereas only at the most 80 to 100 g dust can be accommodated in a conventional vacuum-cleaner bag of the prior art, whether produced from paper or from SMS composites. Evidently, in the vacuum-cleaner bags according to the invention, the whirling material contained in the vacuum-cleaner bag is kept in circulation under the given air flow in an operating state and can thus bind the sucked-in dust already in the air chamber. In this way clogging of the wall materials is obviously prevented. This indicates that not only vacuum-cleaner bags which are produced from paper but also the known SMS composite materials can be considerably improved in respect of their service life by the whirling material. Thus an essential element of the present invention is that the vacuum-cleaner bag contains a material which can be whirled up and kept in circulation under the given flow. In the case of the material according to the invention, it has proved advantageous for it to have a volume per mass unit of $1 \text{ cm}^3/\text{g}$ to $100 \text{ cm}^3/\text{g}$, by particular preference $3 \text{ cm}^3/\text{g}$ to $60 \text{ cm}^3/\text{g}$. The volume per mass unit was determined as follows: 5 g of the bulk goods to be examined are placed in a cylinder with a diameter of 48 mm.

The material is completely loaded using a 250 g plate. The settled height of the bulk goods is read off. From this the volume of the bulk goods and the volume per mass unit in $\text{cm}^3/\text{g}$ are calculated.

From a material point of view, the material which can be whirled up includes preferably all types of fibres and flakes.

In the case of the fibres, chemical fibres and/or natural fibres are preferred. As examples of chemical fibres, cellulose fibres such as viscose should be mentioned. Suitable examples of synthetic fibres are: polyolefins, polyester, polyamides, polyacrylonitrile and polyvinyl alcohol.

The use of recovered fibres from used textiles or production waste is also economically advantageous.

Suitable as materials which can be whirled up are also natural fibres, such as cellulose, wood fibre materials, kapok, flax, jute, Manila hemp, coco, wool, cotton, Kenaf, abaca, mulberry bast and fluff pulp.

A further improvement in respect of the service life arises when the fibres have specific morphological or electrostatic properties. Quite particularly preferred here are charged or uncharged split fibres and/or triboelectric fibre mixtures. The fibres can furthermore be smooth, branched and/or crimped. Advantageous also are hollow or textured fibres and fibres which do not have a round cross-section (e.g. trilobal).

In tests it could be demonstrated that the fibre length also has an influence on the service life of the respective filter bag. In general it can be said that the fibres can have a length of between 0.3 and 100 mm, but it is preferred for the length of the fibres to be 0.5 to 20 mm, by quite particular preference 1 to 9.5 mm. Excellent results are achieved especially when the last-mentioned size conditions are adhered to.

Apart from the fibres, according to the present invention flakes are also to be mentioned as suitable materials which can be whirled up. As materials for the flakes can be considered cellular plastics, non-woven material, textiles, foamed starch, foamed polyolefins and/or films. Foamed starch, which is also available on the market as artificial snow, is particularly suitable here. In the case of the flakes it is advantageous if they are used in a diameter of 0.3 to 30 mm, preferably 0.5 to 20 mm. It was also demonstrated that in respect of the flakes, a diameter of 1 to 9.5 mm is particularly suitable.

A further preferred embodiment relates then to the measure that the materials which can be whirled up have an electrostatically charged surface. Charging the fibres and/or flakes can take place according to the known method on the film or the filaments. It is also advantageous to use triboelectric material combinations such that a charge is produced either by friction between the flakes and/or fibres themselves or by friction between the fibres and/or flakes and the filter material (inside of the bag). Through this embodiment a further improvement of the capacity to absorb dust is achieved for the materials circulating in the filter bag. It is also possible to provide the materials additionally with a functionalised surface. As functionalised surfaces can be used here coatings of the fibres and/or flakes with which the adsorption capacity of the fibres or flakes can be further increased.

The vacuum-cleaner bags according to the invention should preferably be so dimensioned that the volume flow rate through the bag can be 10 m$^3$/h to 400 m$^3$/h. In tests, the applicant could furthermore demonstrate that it is advantageous if 1 to 30 g, preferably 5 to 15 g of the material which can be whirled up is contained per 1000 cm$^3$ volume of the vacuum-cleaner bag.

As the filter material for the vacuum-cleaner bag according to the invention can be considered in principle all the materials known from the prior art. Examples to be mentioned here would be paper and non-woven materials, as well as the SMS composites described initially.

The invention relates furthermore to a method for improving the service life of vacuum-cleaner bags. According to the present invention it is proposed that vacuum-cleaner bags be used which are constructed as described above. The method according to the invention is preferably operated with a volume flow rate of 10 m$^3$/h to 400 m$^3$/h. In the method according to the invention the procedure is preferably such that the material which can be whirled up is introduced into the dust-collecting chamber before the start of the first suction process or at the start of the suction process. Thus, according to a first alternative, provision is made for the material to be already contained in the vacuum-cleaner bag from the start, i.e. the material has already been introduced into the bag during its manufacture, or the material is introduced into the vacuum-cleaner bag subsequently, i.e. sucked in for example. What is essential for the method in every case is always that the material which is contained in the vacuum-cleaner bag is whirled up and can be kept in circulation under the operating conditions, i.e. at the given volume flow rate.

According to a preferred embodiment, it is further proposed in the present invention that the material which can be whirled up is provided in a wrapper. The wrapper must naturally be so designed that it is destroyed at the given volume flow rate in the vacuum-cleaner bag so that the material which can be whirled up is present in loose form in the vacuum-cleaner bag and can then circulate in the vacuum-cleaner bag under the given conditions.

The method according to the invention is preferably a method for vacuum-cleaning using a cylinder vacuum-cleaner or an upright vacuum-cleaner.

BRIEF DESCRIPTION OF DRAWINGS

The invention is explained in greater detail below with the aid of FIGS. 1 to 11.

FIG. 1 shows clogging characteristics;

FIGS. 2 to 4 show the influence of the fibre length and of the bulk weight of cellulose fibres in an SMS bag in comparison with a reference bag made of SMS but without the corresponding fibres;

FIGS. 5 to 7 show the measuring results in relation to synthetic fibres;

FIG. 8 shows the clogging characteristics of an SMS bag which has been filled with various polymer flakes;

FIG. 9 shows a summary of the results;

FIG. 10 shows the improvement potential of a paper bag using the loose filling.

DETAILED DESCRIPTION

Mineral dust type 44956 produced by the company Normsand GmbH, Beckum was used to measure the clogging characteristic.

Figure 1:
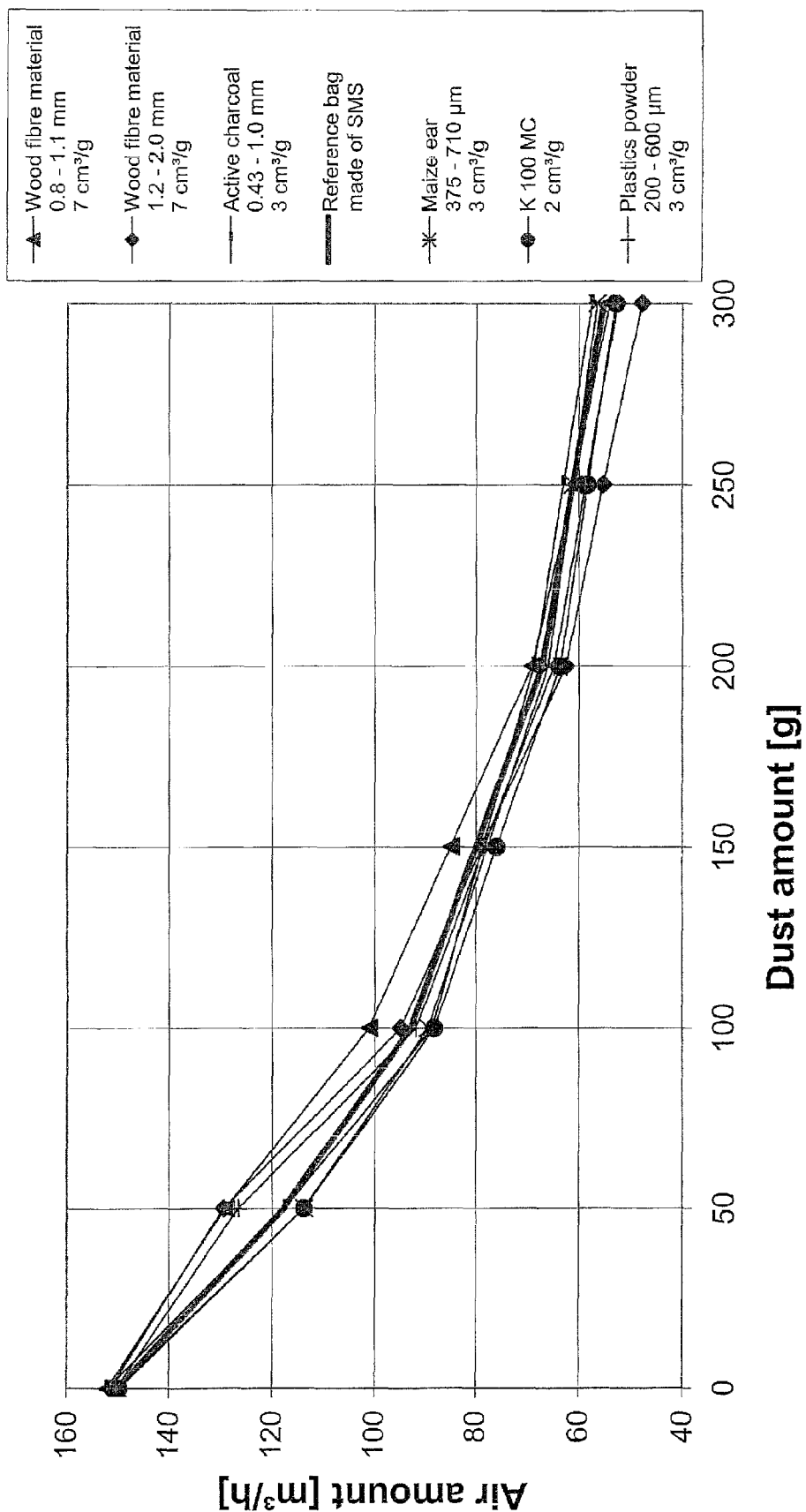
FIGS. 1 to 10 relate to clogging characteristics which show the influence of various fibres and flakes.

FIG. 1 shows clogging characteristics which were recorded using a Miele vacuum-cleaner model S511, in which a vacuum-cleaner bag made of SMS material was used as the reference bag. In this first experiment, a filling of powders or granules, as can be taken from the legend, was put into the vacuum-cleaner bag and the clogging characteristics were recorded and compared with the clogging characteristic of a reference bag made of SMS. As can be seen from FIG. 1, it became apparent that the powders and granules used there in an amount of 21 g had no influence on the clogging characteristic. Active charcoal was used here inter alia as the material. The use of active charcoal in a vacuum-cleaner bag is already known from WO 01/08543 A1. There it is namely proposed to introduce active charcoal into a vacuum-cleaner bag as an odour-adsorbent substance. The essential core of the teaching of the above-described WO publication is that the filling of active charcoal contained in the filter bag acts as an adsorbent agent for odorous substances. However, as the experiments have shown, this filling material does not have any influence on the service life.

Figure 2:
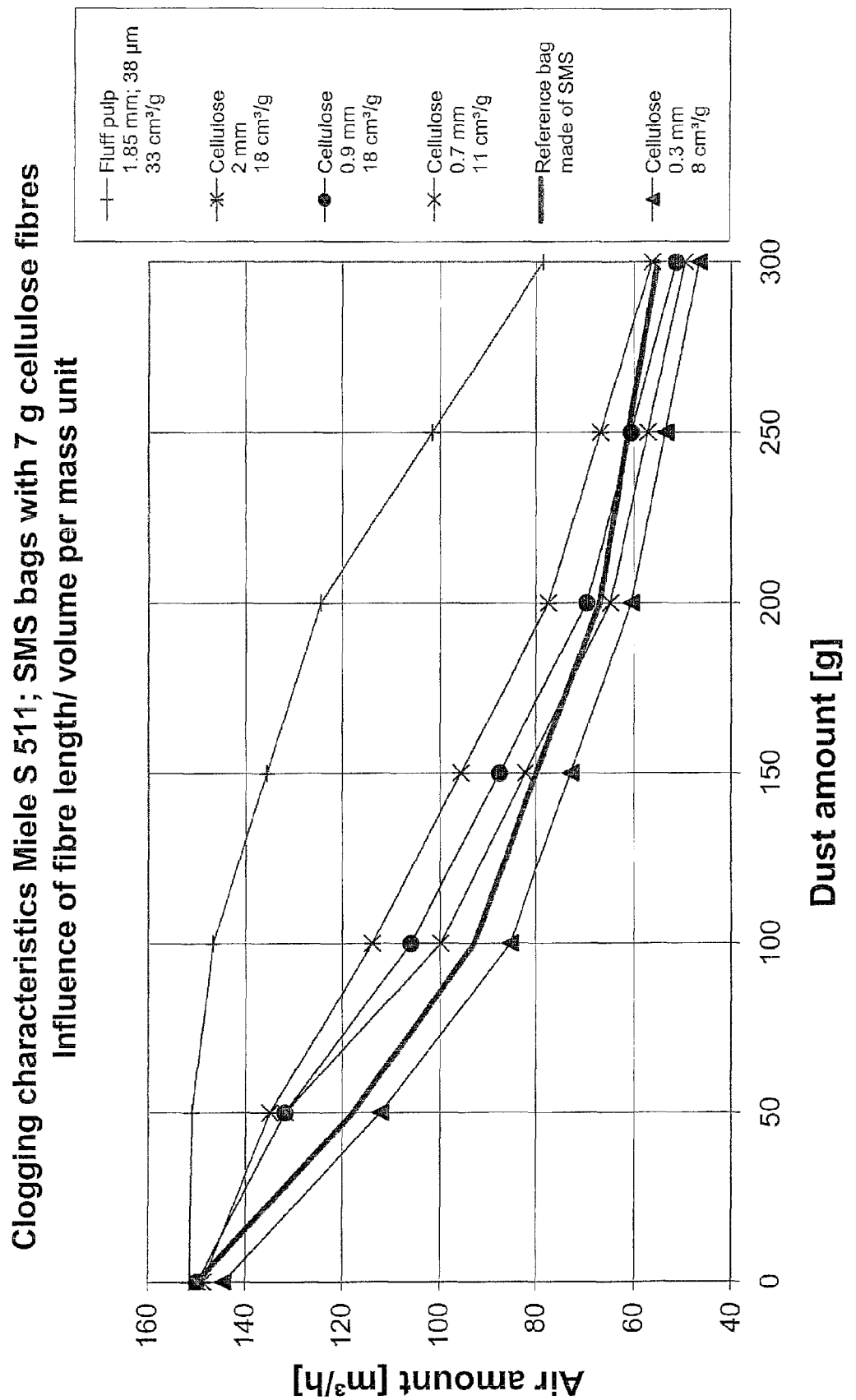
Figure 3:
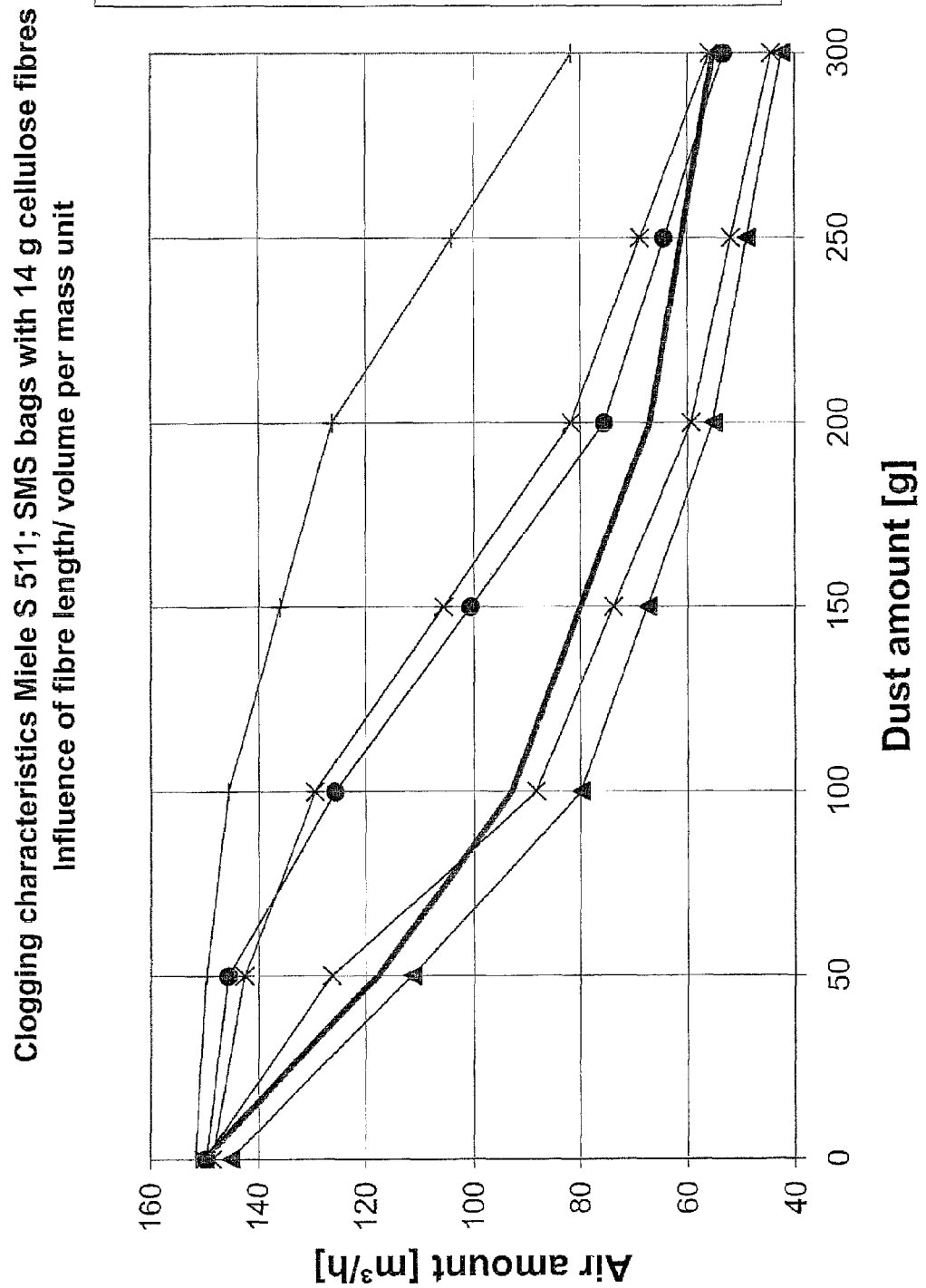
Figure 4:
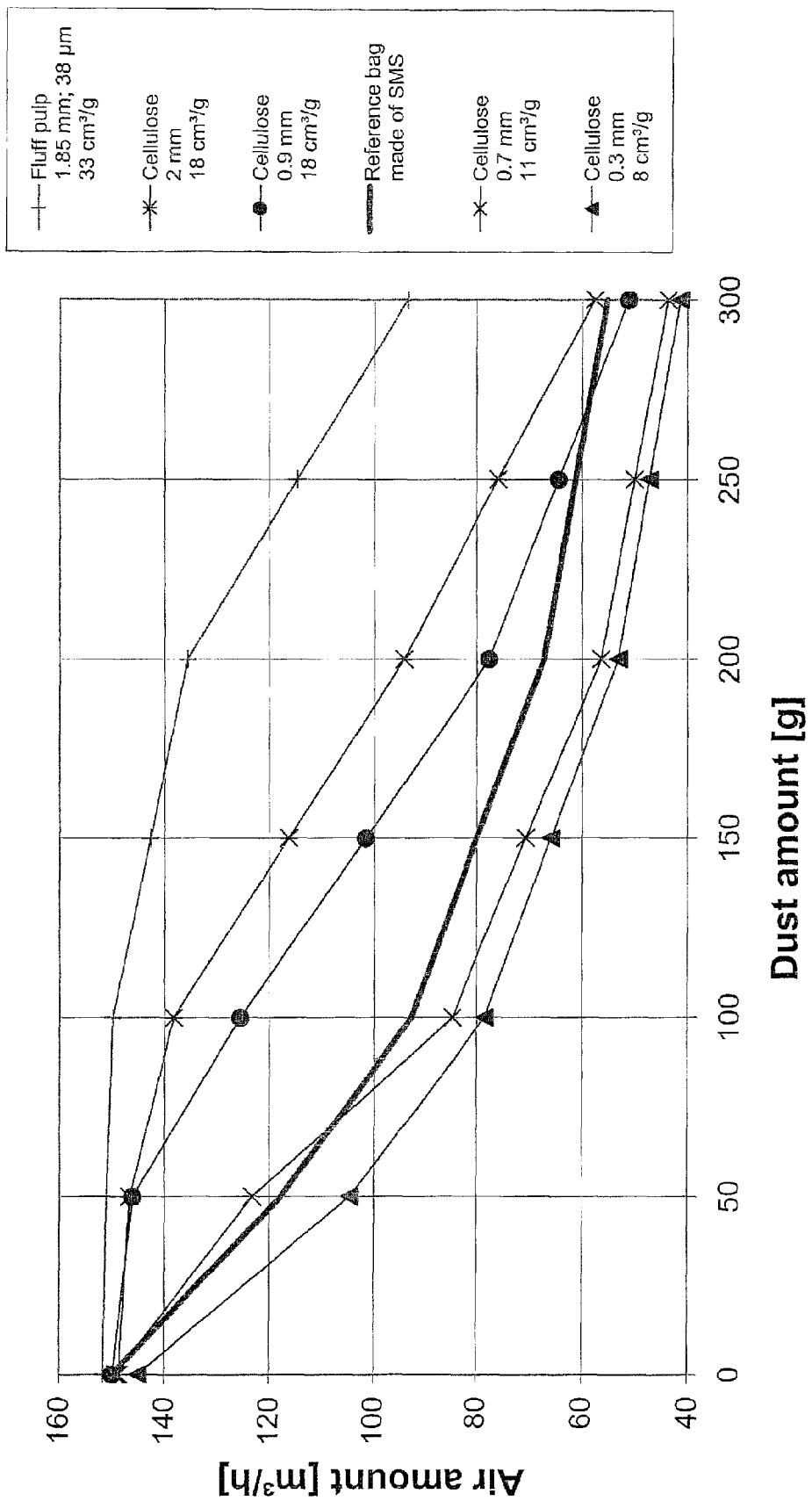

FIGS. 2 to 4 show the influence of the fibre length and of the bulk weight of cellulose fibres in an SMS bag in comparison with a reference bag made of SMS but without the corresponding fibres. As can be seen from FIGS. 2 to 4, due to the use of the cellulose fibres quoted in the legend already a considerable extension of the service life is achieved by comparison with a reference bag made of SMS but without any materials which can be whirled up. The best results are achieved with fluff pulp and a mean fibre length of 1.85 mm. With a whirling material of this type it is accordingly possible to increase the service life greatly by comparison with a reference bag made of SMS. As a general rule, in the case of vacuum-cleaners of the prior art, when the amount of air has reduced to roughly 80 m³/h, a display is switched on indicating that the filter bag should be replaced. In the case of a filter bag of the prior art and made of SMS material a change of filter is thus necessary already with a dust amount of 150 g. If a filter bag according to the invention which has a filling of fluff pulp is used, even with a dust amount of 300 g, the critical amount of air of 80 m³/h is still not reached. In the case of the volume per mass unit, values of 10 to 40 cm³/g are particularly advantageous in the example.

As can also be seen from FIGS. 2 to 4, the amount of the material also has an influence. In general it can be stated that for this example an increase in the amount from 7 to 14 to 21 g produces a further improvement. An SMS bag with 21 g fluff pulp fibres accordingly has by far the best results.

Figure 5:
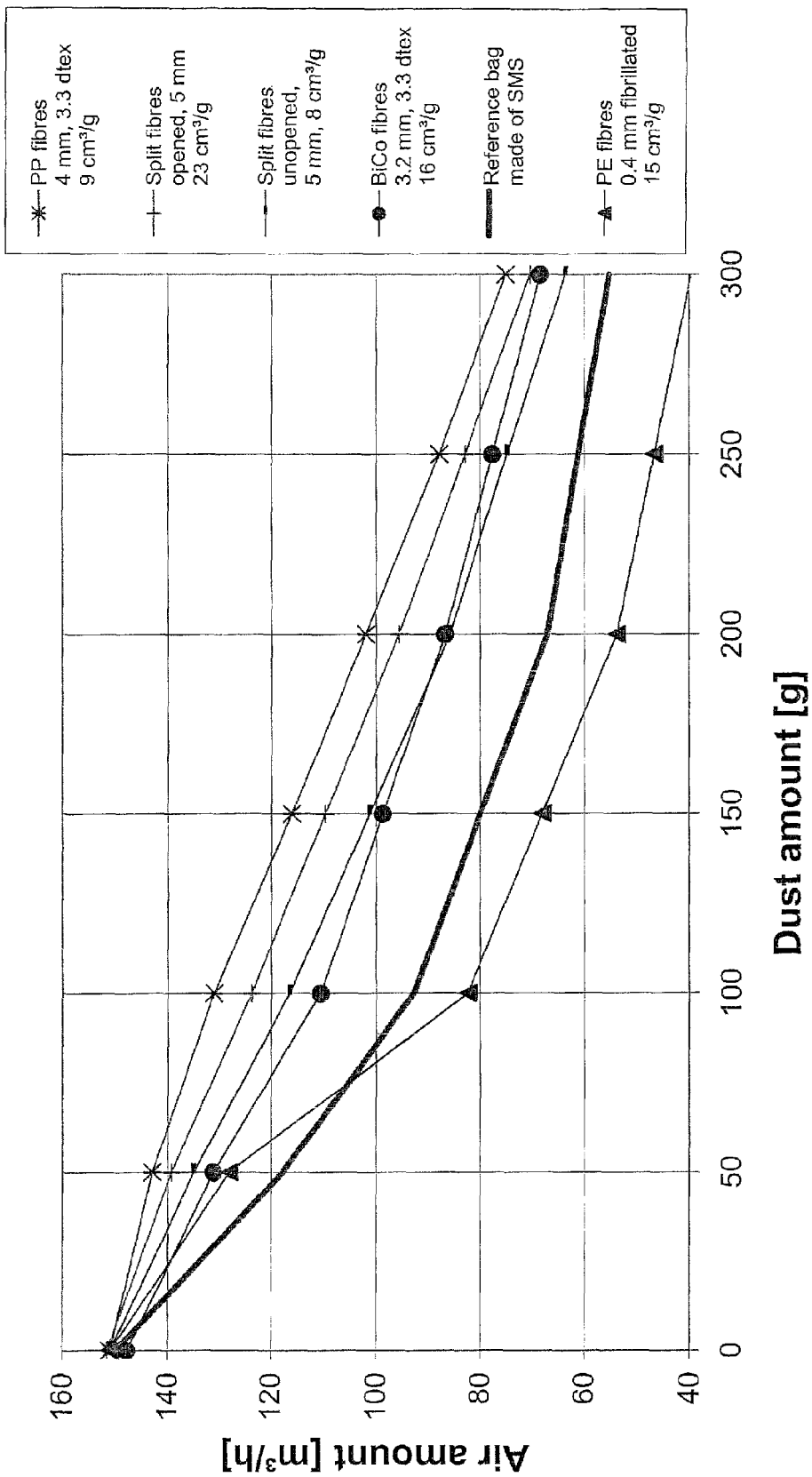
Figure 6:
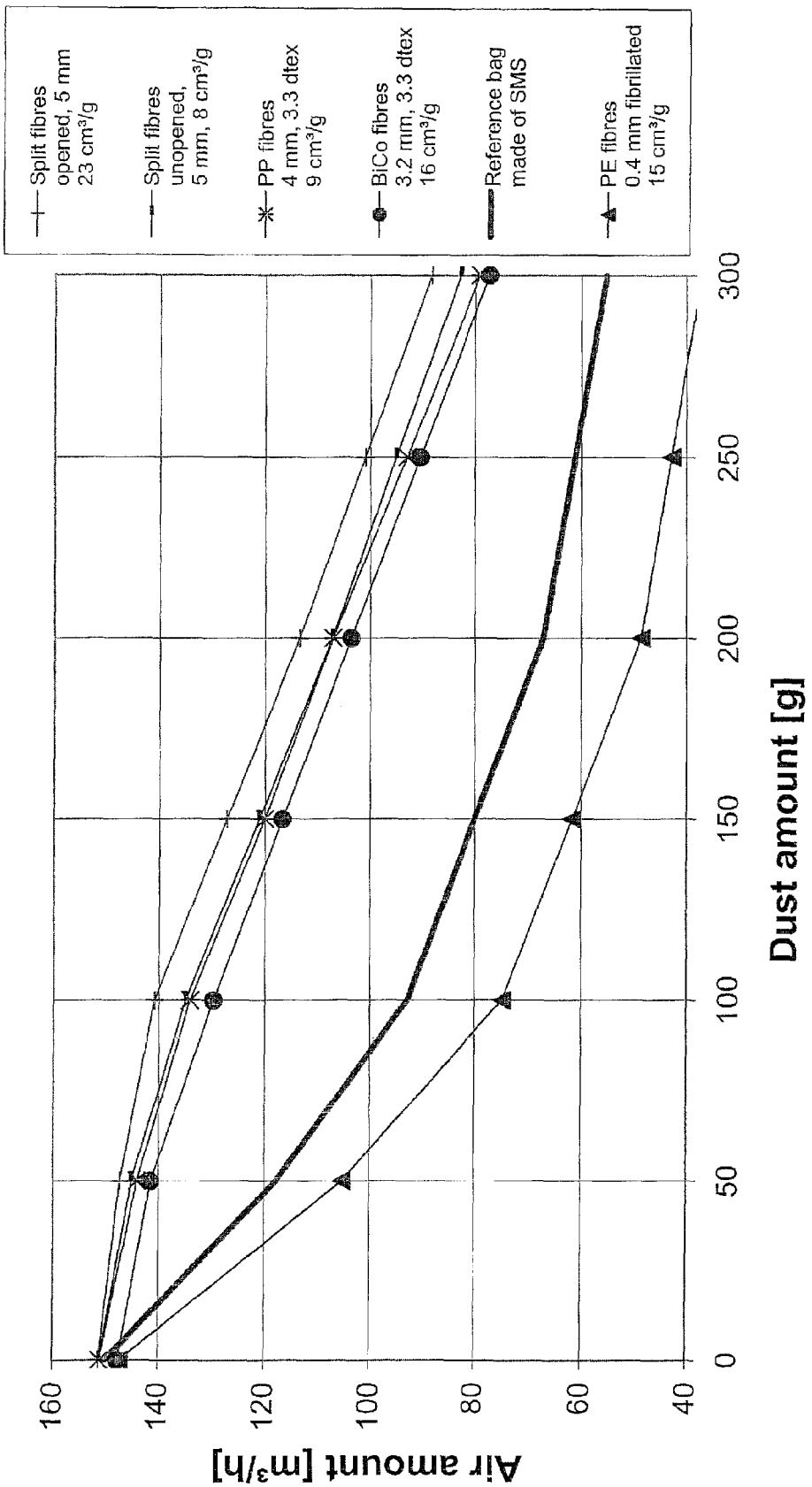
Figure 7:
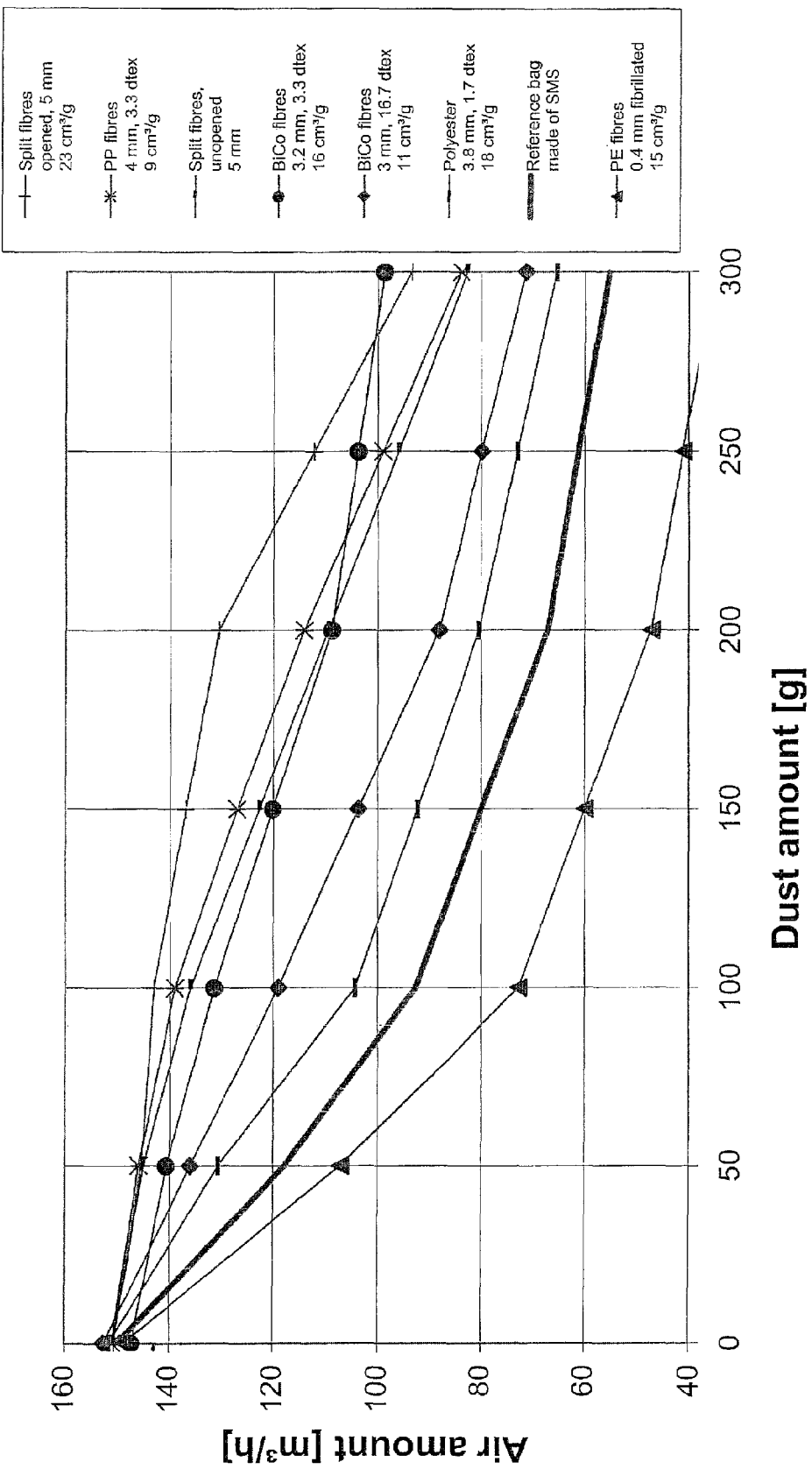

FIGS. 5 to 7 now show the measuring results in relation to synthetic fibres. Here, too, it is clearly shown that in the case of the vacuum-cleaner bag according to the invention which is filled with synthetic fibres which can be whirled up, a clear increase in the service life can be achieved. As is apparent from a comparison of FIGS. 5 to 7, an improvement is noticeable with the increasing weight of the filling. The best results are achieved here with 21 g opened split fibres and a fibre length of 5 mm. Such a vacuum-cleaner bag also does not have anything like the critical amount of air of 80 m³/h even with a dust amount of 300 g.

Figure 8:
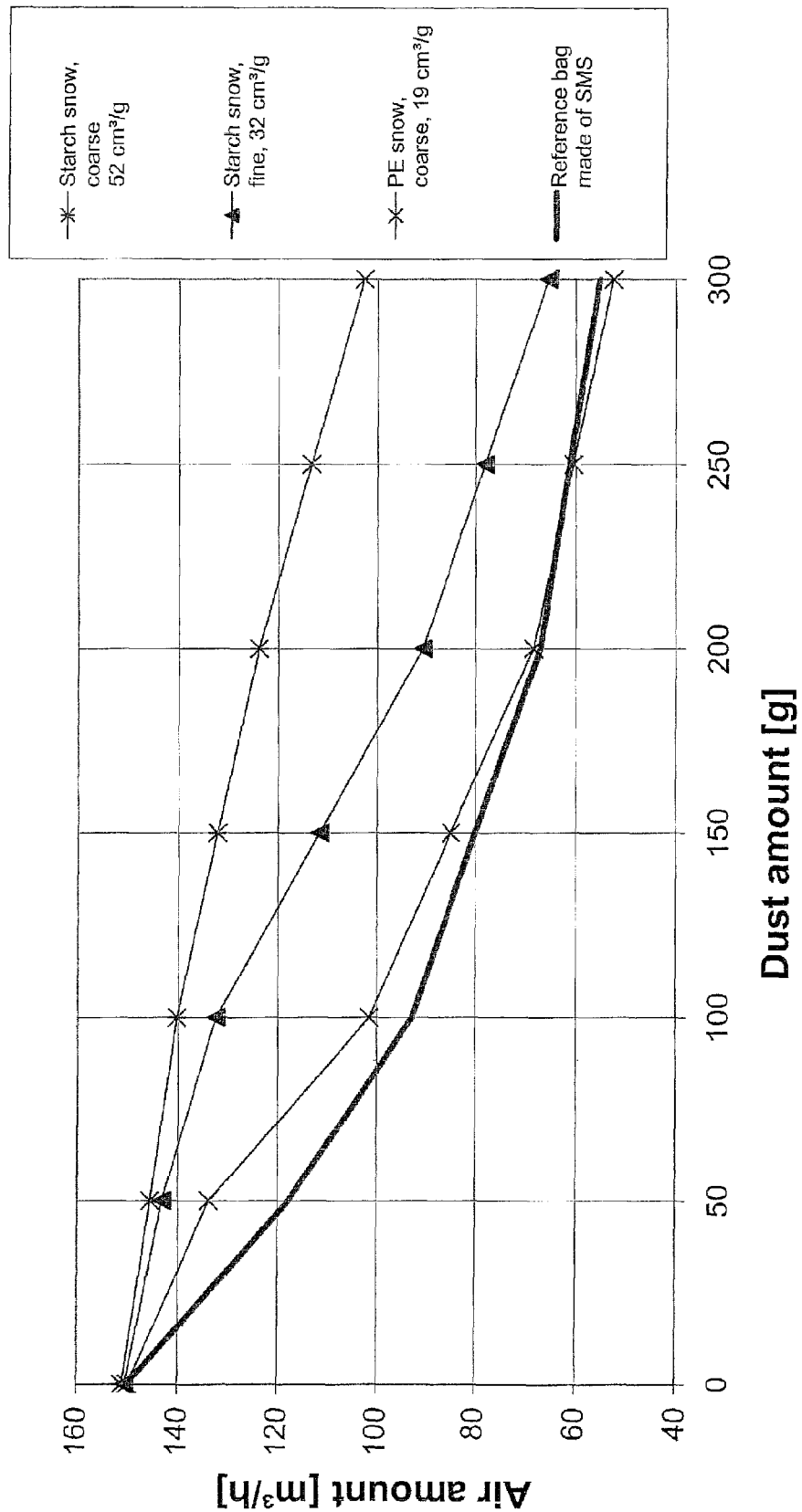

FIG. 8 shows now the clogging characteristics of an SMS bag which has been filled with various polymer flakes. These results also show that a clear extension of the service life is achieved by vacuum-cleaner bags with polymer flakes, especially with starch flakes. The best results were achieved with 21 g starch flakes. The volume per mass unit here was 52 cm³/g.

Figure 9:
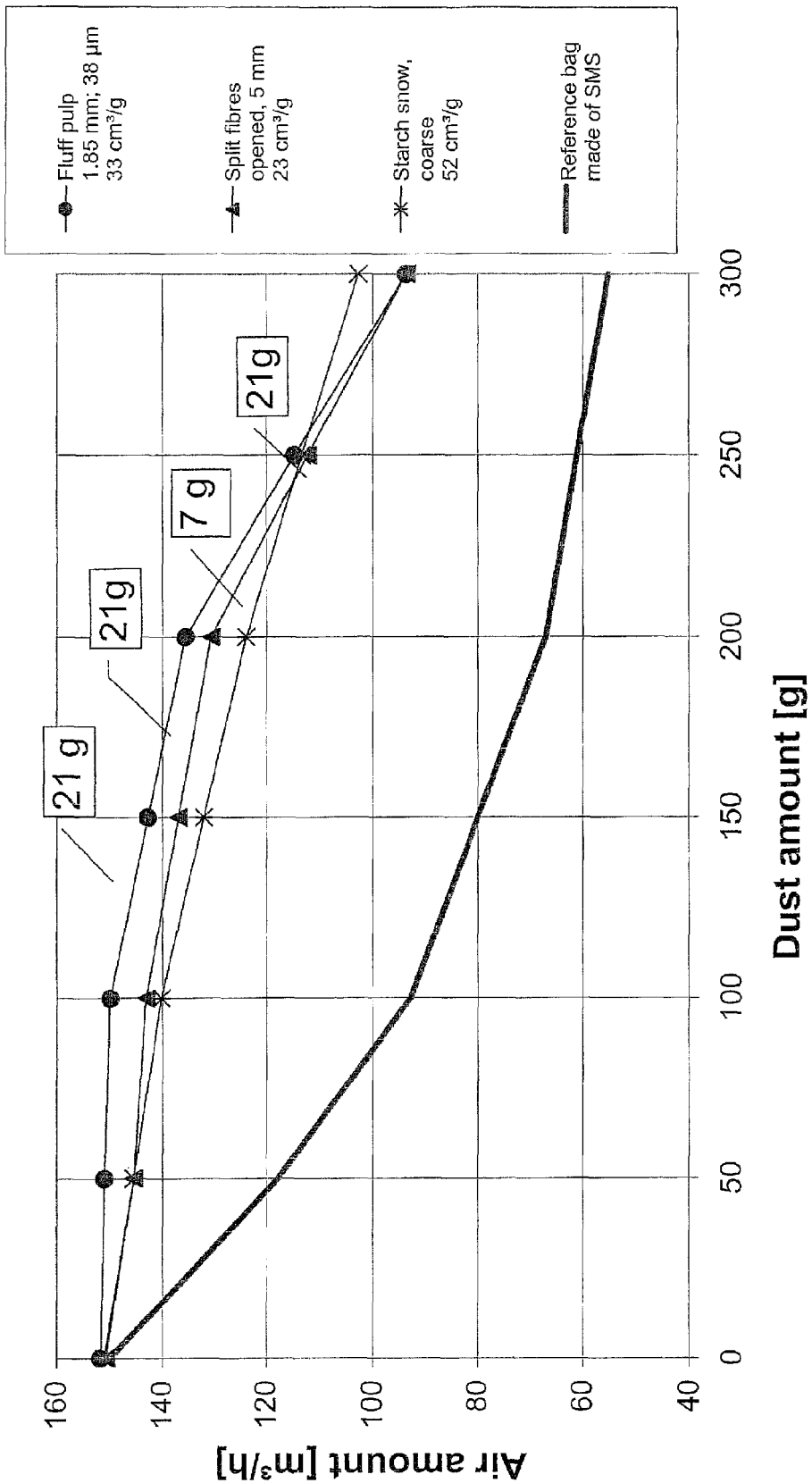

FIG. 9 shows a summary of the results as described above in detail, in which the best results of the corresponding whirling materials have been assembled in a graph. According to this, outstanding results are achieved if the vacuum-cleaner bag contains 21 g fluff pulp having a mean fibre length of 1.85 mm. Split fibres in an amount of approx. 21 g and a mean fibre length of 5 mm also show superior properties. Starch flakes and PP fibres have also proved to be suitable.

Figure 10:
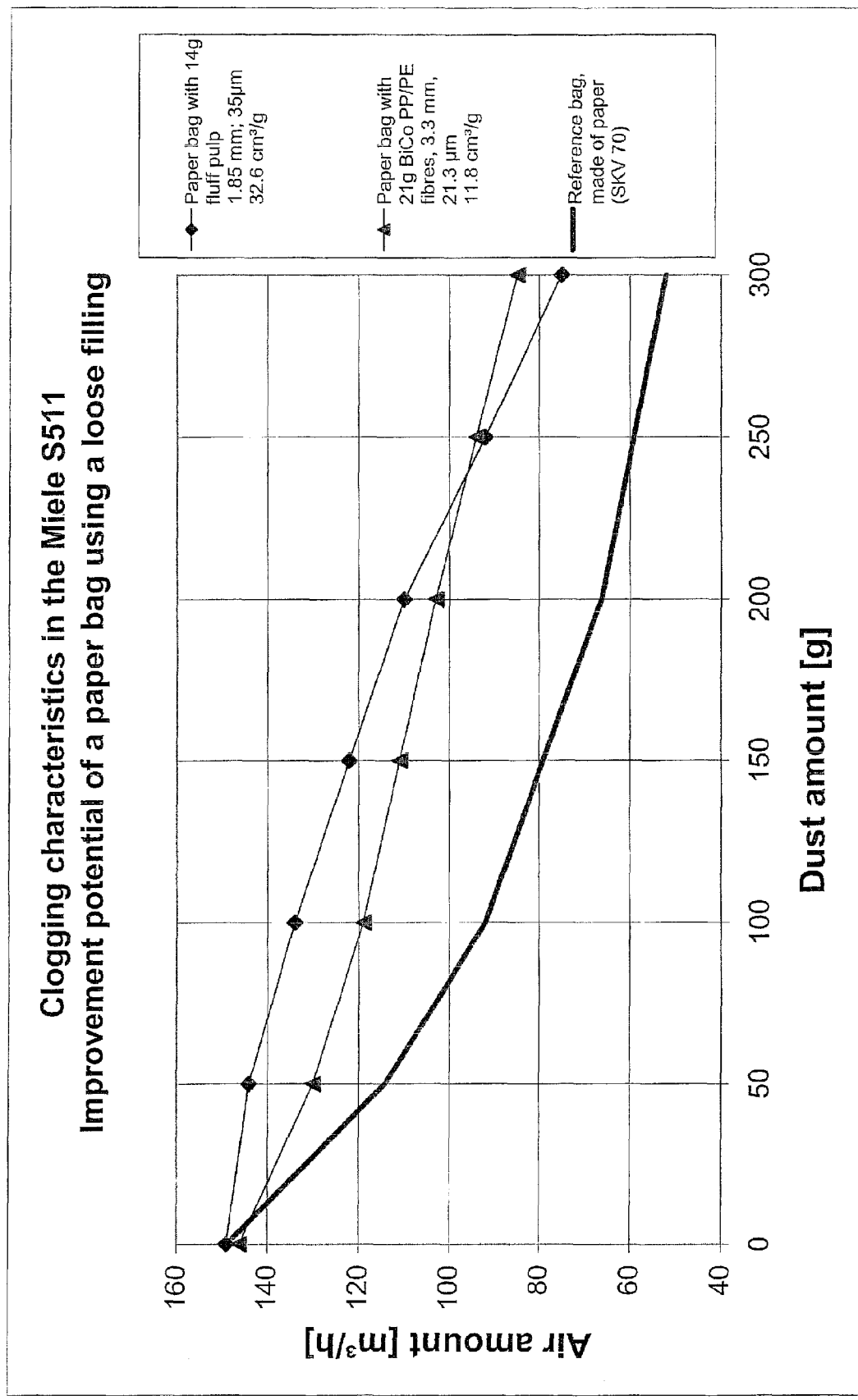

In FIG. 10 is shown the improvement potential of a paper bag using the loose filling, as above.

Figure 11:
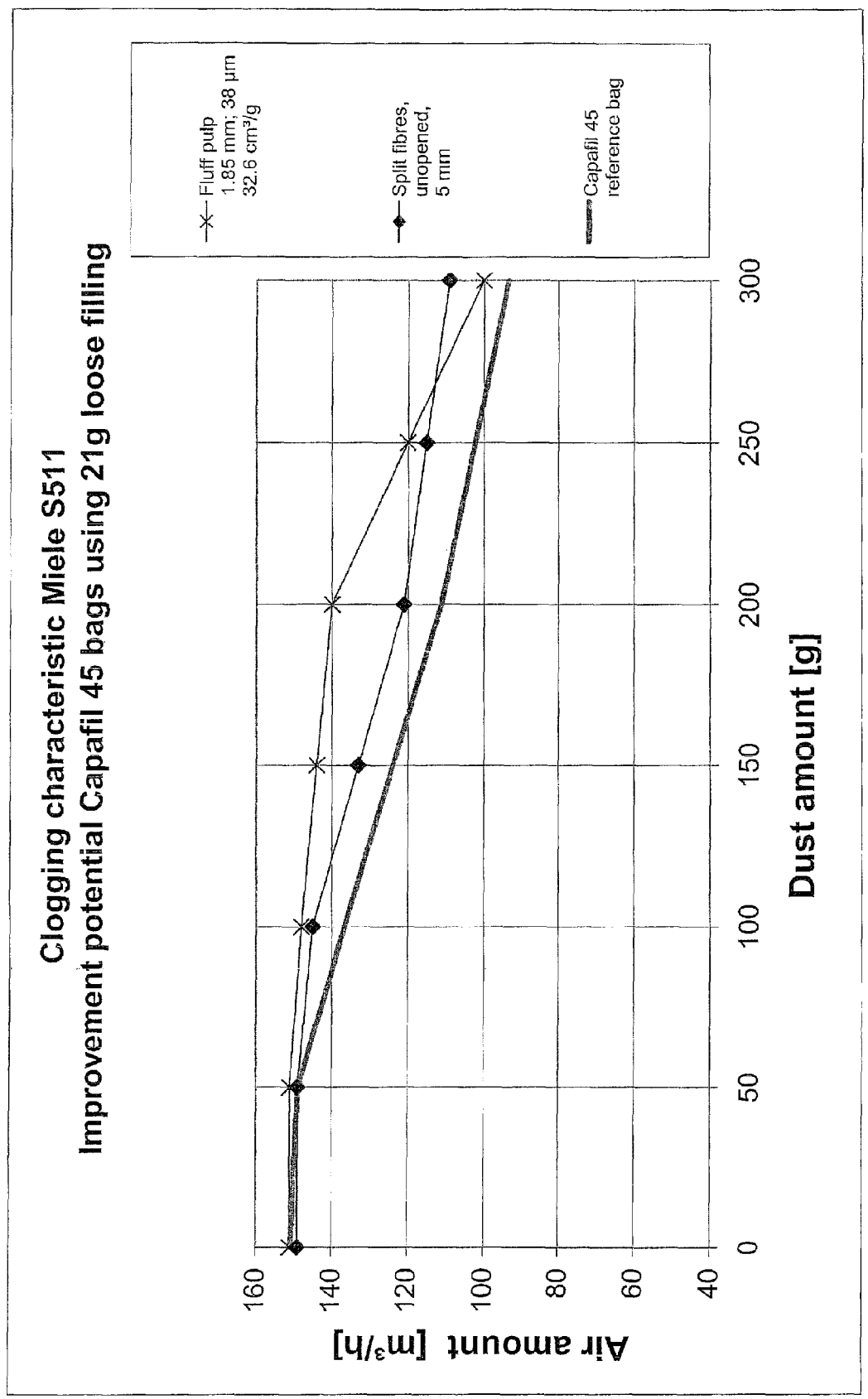
FIG. 11 shows that even vacuum-cleaner bags made of novel filter media can be further improved by the vacuum-cleaner bags according to the present invention.

Finally, FIG. 11 shows that even vacuum-cleaner bags made of novel filter media can be further improved by the vacuum-cleaner bags according to the invention. A filter bag Capatil 45 was used as the reference in FIG. 11. This filter material is described in EP 1 198 280 B1. The service life of this bag can be further improved by the use of fluff pulp 1.85 mm with a volume per mass unit of 32.6 cm³/g.

The invention claimed is:

1. A vacuum cleaner bag, comprising of:
an air-permeable filter material disposed inside the vacuum cleaner bag,
wherein the bag includes, per 1000 cm³ volume, between 1 and 30 g of the material which is whirled up under an air flow, the material being whirled up having a volume per mass unit between 5 cm³/g to 100 cm³/g, and
wherein the material being whirled up is kept in circulation under the air flow in an operating state to bind sucked-in dust already in the vacuum cleaner bag.

2. The vacuum-cleaner bag according to claim 1, wherein the material includes at least one of fibres and flakes.

3. The vacuum-cleaner bag according to claim 2, wherein the fibres are at least one of chemical fibres and natural fibres.

4. The vacuum-cleaner bag according to claim 3, wherein the chemical fibres are cellulose fibres.

5. The vacuum-cleaner bag according to claim 3, wherein the chemical fibres are at least one of viscose fibres and synthetic fibres.

6. The vacuum-cleaner bag according to claim 4, wherein the synthetic fibres are selected from fibres formed from at least one of polyolefins, polyester, polyamides, polyacrylonitrile and polyvinyl alcohol.

7. The vacuum-cleaner bag according to claim 3, wherein the natural fibres are selected from at least one of cellulose, wood fibre materials, kapok, flax, jute, Manila hemp, coco, wool, cotton, Kenaf, abaca, mulberry bast and fluff pulp.

8. The vacuum-cleaner bag according to claim 2, wherein the fibres at least one of (i) are at least one of charged and triboelectric fibre mixtures and (ii) form a triboelectric combination in combination with a filter medium of a dust-collecting filter.

9. The vacuum-cleaner bag according to claim 2, wherein the fibres at least one of (i) are at least one of smooth, branched, crimped, hollow and textured and (ii) have a non-circular cross-section.

10. The vacuum-cleaner bag according to claim 2, wherein the fibres have a trilobal cross-section.

11. The vacuum-cleaner bag according to claim 2, wherein the fibres have a mean length of between 0.3 mm and 100 mm.

12. The vacuum-cleaner bag according to claim 2, wherein the fibres have a mean length of between 0.5 and 20 mm.

13. The vacuum-cleaner bag according to claim 9, wherein the fibres have a mean length of 1 to 9.5 mm.

14. The vacuum-cleaner bag according to claim 2, wherein the flakes are selected from cellular plastics, non-wovens, textiles, foamed starch, foamed polyolefins, films and recovered fibres.

15. The vacuum-cleaner bag according to claim 14, wherein the flakes have a diameter between 0.3 mm and 30 mm.

16. The vacuum-cleaner bag according to claim 14, wherein the flakes have a diameter between 0.5 mm and 20 mm.

17. The vacuum-cleaner bag according to claim 14, wherein the flakes have a diameter between 1 and 9.5 mm.

18. The vacuum-cleaner bag according to claim 1, wherein the material is electrostatically charged.

19. The vacuum-cleaner bag according to claim 1, wherein the vacuum-cleaner bag is dimensioned and designed to have a volume flow rate through the bag between 10 m³/h and 400 m³/h.

20. The vacuum-cleaner bag according to claim 1, wherein between 5 and 15 g of the material are contained per 1000 cm³.

21. The vacuum-cleaner bag according to claim 1, wherein the material is at least one of (i) one of a single-layer paper and a multilayer paper and (ii) a non-woven material.

22. A method for extending a service life of a vacuum-cleaner bag which is operated with a predetermined volume flow rate, comprising:

utilizing the vacuum-cleaner bag according to claim 1.

23. The method according to claim 22, wherein a working volume flow rate is between 10 m³/h and 400 m³/h.

24. The method according to claim 22, comprising: introducing the material into the vacuum-cleaner bag one of (i) before a start of a first suction process and (ii) at the start of the suction process.

25. The method according to claim 22, wherein the material is present in a wrapper, and comprising: introducing the material into the vacuum-cleaner bag one of (i) before a start of a first suction process and (ii) at the start of the suction process.

26. The method according to claim 25, wherein the wrapper is destroyable at a predetermined volume flow rate.

27. The method according to claim 22, wherein the vacuum cleaner is one of a cylinder vacuum-cleaner and an upright vacuum-cleaner.

* * * * *